United States Patent Office 3,216,960
Patented Nov. 9, 1965

3,216,960
NONFLAMMABLE POLYOLEFINS CONTAINING A HALOGENATED ORGANIC ADDITIVE, A COMPOUND OF A GROUP V–A ELEMENT, AND AN ORGANIC PYROPHOSPHATE
Stuart B. Monroe, Wilmington, Del., assignor to Hercules Powder Company, Wilmington, Del., a corporation of Delaware
No Drawing. Filed Jan. 23, 1963, Ser. No. 253,296
5 Claims. (Cl. 260—28.5)

This invention relates to improving the flame resistance of polymers of solid polyolefins without major impairment of the physical and mechanical properties of the polymer, and to the improved flame-resistant compositions.

It has been proposed heretofore to impart flame resistance to polyethylene by incorporating various materials in the polyethylene. Flame resistance has been obtained, for instance, by combining with the polyethylene a solid chlorinated hydrocarbon of high chlorine content, such as chlorinated paraffin, and an inorganic flame-retardant substance such as antimony trioxide in critical proportions to each other and to the polyethylene. Such compositions are described by Happoldt, Jr., in U.S. Patent No. 2,480,298. Other flame-resistant compositions are disclosed by Rugar in U.S. Patent No. 2,590,211 and by Bierly in U.S. Patent No. 2,669,521.

These prior art compositions are generally acceptable from the standpoint of flame resistance but have substantially impaired mechanical properties due to the inclusion of the flame-retardant materials. Such flame-resistant polyethylenes, for example, are subject to excessive embrittlement, particularly after natural or accelerated aging. In addition, the high amount of chlorinated paraffin or other organic chlorinated material which is necessary to produce a good degree of flame resistance acts as a viscosity depressant and adversely affects the resistance of the polyethylene composition to deformation under load at elevated temperatures. The organic flame-retardant materials most frequently used both reduce the viscosity of the composition and increase the tendency to become brittle.

It has been proposed also to incorporate additional nonchlorinated elastomers, sometimes with reduced proportions of the flame-retardant materials, in such flame-resistant polyethylene compositions in an effort to improve these undesirable aging characteristics. Such elastomer materials, of which butyl rubber and polyisobutylene are examples, are themselves flammable, and the flame resistance of the composition is undesirably affected by their inclusion. Addition of nonchlorinated elastomers may be effective in retarding increased embrittlement resulting from natural or accelerated aging, but it does not permit any material reduction in the amount of chlorinated paraffin which is necessary if a satisfactory level of flame resistance is to be obtained.

It has also been proposed to substitute a highly branched chlorine-containing elastomer such as neoprene for a portion of the chlorinated paraffin in such flame-resistant polyethylene compositions in order to improve resistance to embrittlement and deformation under load at elevated temperatures. While these chlorine-containing elastomers do improve the flexibility of the composition, they do not permit any material reduction in the total amount of chlorinated material and antimony trioxide necessary if a satisfactory level of flame resistance is to be obtained. Moreover, such compositions show poor resistance to heat aging.

Applicant has found that a flame-resistant composition of solid polyolefin which contains a reduced amount of halogenated material, a reduced amount of metal-containing flame retardant such as antimony trioxide, and a propoxylated pyrophosphate has improved flame resistance and improved mechanical and physical properties over the prior art flame-resistant compositions containing higher amounts of chlorinated wax and antimony trioxide. This finding was indeed surprising since the phosphorus-containing compounds themselves are flammable and therefore would not be expected to improve the flame resistance of compositions containing reduced amounts of other flame-proofing agents.

Just what the function of the propoxylated pyrophosphate is in the composition is not known. Since it is itself flammable, it does not appear that it is performing as a true flame-proofing agent. However, since its inclusion does permit the use of lesser amounts of the known flame-retardant additives, it is reasonable to assume that it is in some manner synergistically enhancing the flame-retardant properties of these additives. Whatever the function may be, the presence of the propoxylated pyrophosphate improves the flame resistance of polyolefins containing reduced amounts of halogenated material and metal-containing flame retardants and permits the formation of flame-resistant compositions having mechanical and physical properties more closely approximating those of unmodified polyolefins.

Accordingly, the present invention relates to a flame-resistant composition comprising an intimate mixture of, by weight, at least 50% of a solid polymer selected from the group consisting of polyethylene and polypropylene, from 3 to 20% of a halogenated organic additive containing from about 50 to about 80% by weight halogen, from 3 to 15% of a flame-retardant compound of a Group V–A element having an atomic number greater than 32, and 1 to 15% of a propoxylated pyrophosphate of the formula

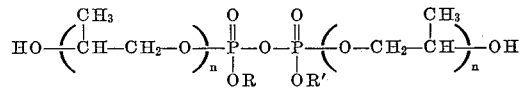

where R and R' are radicals selected from the group consisting of alkyl, aryl, haloalkyl and haloaryl radicals, and $n$ is a number from 1 to 3, the amount of said halogenated organic additive and said flame retardant in combination comprising at least 8% of the mixture.

The following examples, in which all parts are by weight unless otherwise specified, illustrate the invention and in no manner are to be construed as limiting. The term "RSV" as used herein denotes reduced specific viscosity, which is the specific viscosity divided by concentration of a 0.1% weight/volume solution of polymer in decahydronaphthalene at 135° C.

EXAMPLE 1

Seventy-five parts of powdered polyethylene having a specific gravity of 0.945 and an RSV of 3.8, 14 parts chlorinated paraffin containing about 70% chlorine, 7 parts antimony trioxide (50–100 mesh), and 4 parts propoxylated dibutyl pyrophosphate

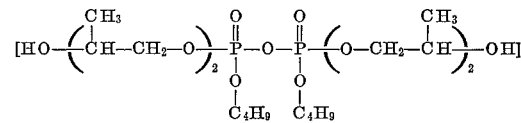

were thoroughly mixed on a 2-roll mill at 290° F. by adding each constituent separately and then continuing the milling for 15 minutes after the last addition. Fifty parts of the opaque, white product was then cut into small pieces and compression molded into sheets 6 x 6 x 0.075" at 340° F. using an electrically heated hydraulic press and a molding cycle of 10 minutes at a total pressure of 12 tons. Strips 0.5" in width were cut from the molded sheet and were tested for flammability in accordance with ASTM D635–56T, for tensile strength in accordance with ASTM D638–58T, and visually for color after exposure to a temperature of 400° F. for varying periods of time. Test results for this example, as compared with a control prepared in the same manner but without the addition of the pyrophosphate and with polyethylene alone (containing no additives), are recorded in Table I.

*Table I*

|  | Example 1 | Control | Polyethylene |
|---|---|---|---|
| Flammability | Non-burning | Self-extinguishing. | Burning. |
| Yield strength (p.s.i.) | 3,490 | 3,400 | 3,520. |
| Color after exposure to 400° F. for: | | | |
| 0 min | White | White | Milky white. |
| 15 min | ___do___ | Cream-yellow | Do. |
| 30 min | White-yellow | Yellow-tan | Yellow white. |
| 45 min | Yellow | Tan | Do. |
| 60 | ___do___ | ___do___ | Yellow. |
| 90 min | ___do___ | Tan-brown | Do. |

EXAMPLE 2

A solution of 4 parts of the propoxylated dibutyl pyrophosphate of Example 1 in approximately 51 parts acetone was thoroughly mixed with 71 parts powdered polyethylene having a specific gravity of 0.945 and an RSV of 1.8, and the acetone evaporated by heating the mixture in a steam-heated oven at 65° C. for 1 hour and then under vacuum at 65° C. for 1 hour. This mixture was then blended with 15 parts tetrabromophthalic anhydride (69% bromine) and 10 parts of 50–100 mesh antimony trioxide for 5 minutes in a Waring Blendor and compounded on a 2-roll mill at 270° F. for 10 minutes. A portion of the milled sheet was compression molded, cut into strips, and tested for flammability in accordance with the procedure of Example 1. The composition and flammability rating, as compared with a first control containing the same concentrations of tetrabromophthalic anhydride and antimony trioxide but no propoxylated dibutyl pyrophosphate and with a second control containing the same amount of polyethylene, increased amounts of tetrabromophthalic anhydride and antimony trioxide but no propoxylated dibutyl pyrophosphate, are given in Table II.

*Table II*

|  | Example 2 | Control 1 | Control 2 |
|---|---|---|---|
| Composition (parts by weight): | | | |
| Polyethylene | 71 | 75 | 71 |
| Tetrabromophthalic anhydride | 15 | 15 | 17.4 |
| Antimony trioxide | 10 | 10 | 11.6 |
| Propoxylated dibutyl pyrophosphate | 4 |  |  |
| Flammability | (¹) | (²) | (²) |

¹ Self-extinguishing.   ² Burning.

EXAMPLE 3

The procedure of Example 2 was repeated using 4 parts of the propoxylated dibutyl pyrophosphate of Example 1 dissolved in 75 parts benzene, 86 parts powdered polyethylene having a specific gravity of 0.945 and an RSV of 3.8, 5 parts chlorinated wax containing 70% chlorine, and 9 parts 50–100 mesh antimony trioxide. Tests on 0.5" strips cut from the compression-molded sheets gave a flammability rating of self-extinguishing according to ASTM D635–56T. A control composition prepared in the same manner except that no pyrophosphate was added was rated as burning.

EXAMPLE 4

A solution of 16 parts propoxylated diphenyl pyrophosphate

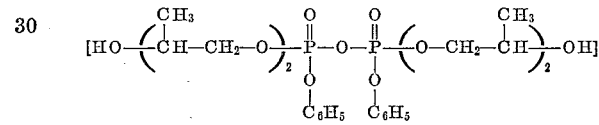

in 260 parts acetone was mixed with 328 parts polyethylene having a specific gravity of 0.92 and an RSV of 1.5 and the mixture dried at 60° C. in a steam-heated oven and then heated under vacuum at 60° C. The dried mixture was then blended with 36 parts antimony trioxide and 20 parts chlorinated paraffin wax containing 70% chlorine in a Waring Blendor and extruded at 400° F. using an N.R.M. 1-inch extruder. The extrudate was chopped into ⅛" pellets, the pellets re-extruded, and pellets therefrom compression molded into sheets at 340° F. for 10 minutes at a total pressure of 14 tons. Strips 5 x 0.5 x 0.075" cut from the sheets were rated as self-extinguishing in accordance with ASTM D635–56T. A control sample containing no pyrophosphate was rated as burning.

EXAMPLE 5

Example 1 was repeated except that polypropylene having an RSV of 3.8 was used in place of the polyethylene, and the mixture was milled at 340° F. and compression molded at 400° F. at a total pressure of 14 tons. Details of the composition and test results, as compared with two controls, are recorded in Table III.

*Table III*

|  | Example 5 | Control 1 | Control 2 | Polypropylene |
|---|---|---|---|---|
| Composition (parts by weight): | | | | |
| Polypropylene | 75 | 75 | 75 | 100. |
| Chlorinated paraffin wax (70.9% chlorine) | 14 | 14 | 16.7 |  |
| Antimony trioxide | 7 | 7 | 8.3 |  |
| Propoxylated dibutyl pyrophosphate | 4 |  |  |  |
| Flammability | Nonburning | Self-extinguishing. | Self-extinguishing. | Burning. |
| Yield strength (p.s.i.) | 4,930 | 4,430 | 4,250 | 5,300. |
| Color after exposure at 400° for: | | | | |
| 0 min | White | Cream beige | Beige | Water white. |
| 15 min | Grey | Beige | ___do___ | Do. |
| 30 min | Beige | ___do___ | ___do___ | Clear yellow. |
| 45 min | ___do___ | ___do___ | Tan | Do. |
| 60 min | ___do___ | ___do___ | ___do___ | Do. |
| 90 min | ___do___ | ___do___ | Brown | Do. |

EXAMPLE 6

Example 2 was repeated using 15 parts chlorendic anhydride (57% chlorine) in place of the tetrabromophthalic anhydride. The product was rated as self-extinguishing whereas a control containing the same concentrations of chlorendic anhydride and antimony trioxide was rated as burning.

The flame-proofing composition of the present invention comprises an intimate mixture of at least 50% by weight of a solid polyolefin, e.g., polyethylene or polypropylene, from 3 to 20% of a highly halogenated organic additive, from 3 to 15% of a flame-retardant metal compound, and from 1 to 15% of a propoxylated pyrophosphate, the amount of the halogenated additive and flame-retardant metal compound in combination comprising at least 8% of the mixture. The highly halogenated organic additive may comprise any high molecular weight compound or mixture of compounds containing between 50 and 80% halogen, such as chlorinated or brominated aliphatic, cycloaliphatic or aromatic compounds, and the like. Particularly suited are halogenated paraffin hydrocarbons, waxes, fats, higher fatty acids, higher fatty acid esters, aromatic ethers, anhydrides, hydrocarbons or esters, bicyclic ethers, anhydrides, hydrocarbons or esters, and the like, such as chlorinated paraffin wax, chlorendic anhydride, i.e., 1,4,5,6,7,7-hexachlorobicyclo[2,2,1]-hept-5-ene-2,3-dicarboxylic anhydride, tetrabromophthalic anhydride, condensation products of hexachlorocyclopentadiene, and the like. The flame-retardant compound of a metal having an atomic number greater than 32 may suitably be chosen from the group consisting of bismuth oxide, arsenic oxide, antimony oxide, bismuth sulfide, arsenic sulfide, antimony sulfide, triphenyl stibene, and antimony potassium tartrate, it being preferred to employ antimony oxide because of its availability and high flame-proofing activity with the halogenated organic additives.

The propoxylated pyrophosphates of this invention have the formula

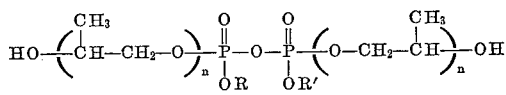

where R and R' are radicals selected from the group consisting of alkyl, aryl, haloalkyl, and haloaryl radicals, and $n$ is a number from 1 to 3. In the previously assigned formula, the R and R' substituents are numerous and varied. Suitable alkyl and halo-substituted radicals which R and R' can comprise are ethyl, propyl, butyl, pentyl, hexyl, chloroethyl, and chlorobromopropyl. Suitable aryl and haloaryl radicals include phenyl, chlorophenyl, bromophenyl, dichlorophenyl, and trichlorophenyl radicals.

The propoxylated pyrophosphates of the invention may be made by reacting propylene oxide with the reaction product of phosphorus pentoxide and the appropriate alcohol or mixture of alcohols. For example, propoxylated dibutyl pyrophosphoric acid was produced by slowly adding over 2.5 hours with agitation 1 mole of phosphorus pentoxide to 2 moles of butyl alcohol while maintaining the temperature of the mixture below 15° C., gradually elevating the temperature to 35–40° C. over 2 hours, allowing the mixture to sit overnight at room temperature, heating the product for 2 hours at 70° C., and then adding propylene oxide to the product dropwise with agitation while maintaining the temperature at 35–45° C. When all the propylene oxide was reacted, excess oxide was removed and a product having a hydroxyl number of about 210 was obtained.

The compositions of the present invention may also include small amounts of outer materials such as clay, pigments such as carbon blacks and the phthalocyanins, antioxidants, and stabilizers for either or both the polymer and the halogenated organic additive, lubricants, and other resinous materials in order to modify the properties of the composition for a particular application. However, the addition of such materials should be made in small proportions, usually not greater than 10% of the combined weights of polymer and flame-retardant materials. In any case, the proportion of the other materials must not be so high that they offset the advantages to be gained from the particular combination of the present invention and of course should not appreciably if at all reduce the flame retardance of the composition. These additional ingredients may be incorporated in the composition at the same time the main components are being mixed, that is, by rolling on a mill, mixing in a Banbury mixer, plasticating, or, if desired, by solvent mixing with subsequent evaporation of the solvent.

The compositions of this invention may be prepared by mixing the halogenated organic additive, the flame-retardant metal compound, and the pyrophosphate with the polymer by any known method provided the final composition is homogeneous. Erratic results may be obtained, especially in the flame-retardance test, if the composition has not been thoroughly blended to give an intimate mixture of the essential solid ingredients. Conventional methods of compounding the ingredients include working them together on heated rolls, masticating the ingredients in a heated Banbury mixer, and working the ingredients together by means of a screw such as in a plasticator. Preferably, the components are blended together at a temperature above the melting point of the polymer, the blending temperature in most cases being in the range of 240 to 440° F. After a uniform blend is obtained, the composition may be sheeted out on hot rolls and then cut in a cube cutter or in a ball and jewel cutter or the like into small particles of any desired granule size and shape.

The temperature used in compounding the compositions of this invention as well as that used in molding and extruding the compositions into useful articles should be above the melting point of the polymer. This will enable the production of homogeneous compositions which can be fabricated into finished articles having the best surface appearance as well as accomplishing the production at economically feasible processing cycles. However, caution should be observed so as not to raise the temperature of the compositions high enough to decompose the halogenated additive. The upper temperature limit permissible depends of course upon the decomposition temperature of the particular halogenated additive employed, upon whether or not a thermal stabilizer is present in the composition, and upon the time and technique required for processing. For example, with unstabilized chlorinated paraffin a batch temperature above 400° F. will cause some decomposition, which may result in discoloring of the resulting polymer composition. Thus, extrusion and molding temperatures in the range of 350 to 400° F. are recommended for short cycles when employing unstabilized chlorinated paraffin. If a thermal stabilizer for the chlorinated paraffin is present, the working and fabricating temperature of the batch may be raised above 400° F., the latitude permitted depending on the efficacy of the stabilizer employed.

The chief advantage of the compositions of this invention is the fact that they provide a material which is self-extinguishing and passes the high standards for flame retardance set by Underwriters' Laboratories, while still retaining good tensile strength in addition to the other excellent physical and mechanical properties of unmodified polymer.

The instant compositions are especially useful for insulating wires and cables for use at both low and high frequencies, such as shipboard cables, television lead-in wires, bus bar insulation, and the like. The use of these compositions is not limited to the wire insulation field since the compositions may also be compression or injection molded into various articles such as household electrical plugs, radio tube sockets, bases, grommets, coil forms, high voltage bushings, cases for coils and transformers, and many other articles. In fact, the compositions of this invention may be used in any other applications where a high degree of flame retardance is required in combination with the excellent physical and mechanical properties of polyethylene or polypropylene.

As many apparently widely different embodiments of this invention may be made without departing from the spirit and scope thereof, it is to be understood that the invention is not limited to the specific embodiments thereof except as defined in the appended claims.

What I claim and desire to protect by Letters Patent is:

1. A flame-resistant composition comprising an intimate mixture of, by weight, at least 50% of a solid polymer selected from the group consisting of polyethylene and polypropylene, from 3 to 20% of a halogenated organic additive containing from about 50% to about 80% by weight halogen and selected from the group consisting of chlorinated paraffin wax, chlorendic anhydride and tetrabromophthalic anhydride, from 3 to 15% of a flame-retardant compound of a Group V–A element having an atomic number greater than 32, and 1 to 15% of an organic pyrophosphate having the formula

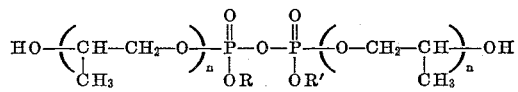

where R and R' are radicals selected from the group consisting of ethyl, propyl, butyl, pentyl, hexyl, chloroethyl, chlorobromopropyl, phenyl, chlorophenyl, bromophenyl, dichlorophenyl and trichlorophenyl radicals, and $n$ is a number from 1 to 3, the amount of said halogenated additive and said flame retardant in combination comprising at least 8% of the mixture.

2. The composition of claim 1 wherein the organic pyrophosphate has the formula

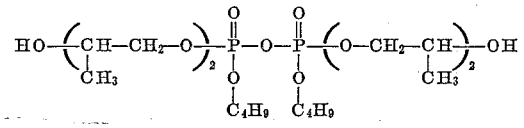

3. The composition of claim 1 wherein the flame retardant compound is selected from the group consisting of bismuth oxide, arsenic oxide, antimony oxide, bismuth sulfide, arsenic sulfide, antimony sulfide, triphenyl stibene and antimony potassium tartrate.

4. A flame-resistant composition comprising an intimate mixture of by weight, at least 50% of a solid polymer selected from the group consisting of polyethylene and polypropylene, from 3 to 20% of chlorinated paraffin wax containing from about 50% to about 80% by weight chlorine, from 3 to 15% of antimony trioxide and from 1 to 15% of an organic pyrophosphate having the formula

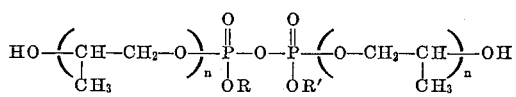

where R and R' are radicals selected from the group consisting of ethyl, propyl, butyl, pentyl, hexyl, chloroethyl, chlorobromopropyl, phenyl, chlorophenyl, bromophenyl, dichlorophenyl and trichlorophenyl radicals, and $n$ is a number from 1 to 3, the amount of said chlorinated paraffin wax and said antimony trioxide in combination comprising at least 8% of the mixture.

5. The composition of claim 4 wherein the organic pyrophosphate has the formula

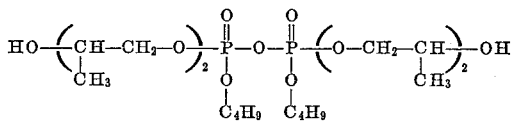

References Cited by the Examiner

UNITED STATES PATENTS

| | | | |
|---|---|---|---|
| 2,480,298 | 8/49 | Happoldt | 260—41 |
| 2,493,390 | 1/50 | Chaban | 260—45.7 |
| 2,590,211 | 3/52 | Rugar | 260—28.5 X |

LEON J. BERCOVITZ, *Primary Examiner.*

DONALD E. CZAJA, *Examiner.*